(12) United States Patent
Uebelacker et al.

(10) Patent No.: US 9,533,607 B2
(45) Date of Patent: Jan. 3, 2017

(54) PADDING OVERLAP

(75) Inventors: Roland Uebelacker, Pfreimd (DE);
Johann Deml, Thanstein (DE); Sergej Schustjew, Sulzbach-Rosenberg (DE)

(73) Assignee: GRAMMER AG, Amberg (DE)

( * ) Notice: Subject to any disclaimer, the term of this patent is extended or adjusted under 35 U.S.C. 154(b) by 125 days.

(21) Appl. No.: 13/425,788

(22) Filed: Mar. 21, 2012

(65) Prior Publication Data

US 2012/0261966 A1    Oct. 18, 2012

(30) Foreign Application Priority Data

Mar. 28, 2011 (DE) ........................ 10 2011 015 348

(51) Int. Cl.
| | |
|---|---|
| B60N 2/48 | (2006.01) |
| B60N 2/68 | (2006.01) |
| B60N 2/44 | (2006.01) |
| B60N 2/22 | (2006.01) |

(52) U.S. Cl.
CPC ................ B60N 2/449 (2013.01); B60N 2/22 (2013.01); B60N 2/4802 (2013.01); B60N 2/4808 (2013.01); B60N 2/68 (2013.01); B60N 2002/4891 (2013.01)

(58) Field of Classification Search
CPC ............... B60N 2002/4888; B60N 2002/4891; B60N 2/4808; B60N 2/4802; B60N 2/449; B60N 2/68; B60N 2/22; A47C 7/383
USPC .......... 297/391, 394, 396, 397, 399, 452.18, 61, 297/14, 452.19, 395, 404, 358
See application file for complete search history.

(56) References Cited

U.S. PATENT DOCUMENTS

| | | | | |
|---|---|---|---|---|
| 409,389 | A | * | 8/1889 | Campbell ...................... 297/394 |
| 531,165 | A | * | 12/1894 | Denio ........................... 297/129 |
| 1,238,782 | A | * | 9/1917 | Keye ......................... 297/230.11 |
| 1,579,585 | A | * | 4/1926 | Wieder et al. ................. 297/394 |
| 2,153,155 | A | * | 4/1939 | Page et al. ..................... 297/342 |
| 2,527,544 | A | * | 10/1950 | Goodwin ....................... 297/397 |
| 2,622,660 | A | | 12/1952 | Stratton |
| 2,756,808 | A | * | 7/1956 | Eichorst ................... 297/230.11 |
| 2,897,878 | A | * | 8/1959 | Mungovan .................... 297/399 |

(Continued)

FOREIGN PATENT DOCUMENTS

| | | |
|---|---|---|
| CN | 101516729 | 8/2009 |
| DE | 2201537 A1 | 7/1973 |

OTHER PUBLICATIONS

Examination Report prepared by the German Patent Office on Oct. 7, 2011, for German Application No. 102011015348.9.

(Continued)

*Primary Examiner* — David R Dunn
*Assistant Examiner* — Tania Abraham
(74) *Attorney, Agent, or Firm* — Sheridan Ross P.C.

(57) ABSTRACT

The invention relates to a vehicle seat (1) with a framework (2) for fastening the vehicle seat (1) to a vehicle body (6), with a seat part (3), with a backrest (4) and with a head support (5) comprising a head support suspension (9), in which the seat part (3) and the backrest (4) are arranged on the framework (2), in which the head support suspension (9) is formed by the framework (2) or is fastened to the framework (2) and in which the head support suspension (9) has a suspension part (12) on the side towards the framework and a suspension part (13) on the side towards the backrest, wherein the suspension part (13) on the side towards the backrest is arranged outside the backrest (4).

14 Claims, 4 Drawing Sheets

(56) References Cited

U.S. PATENT DOCUMENTS

| | | | |
|---|---|---|---|
| 2,996,333 A * | 8/1961 | Kinsman | 297/399 |
| 3,062,586 A | 11/1962 | Rowland | |
| 3,178,733 A * | 4/1965 | Wachsman | 5/632 |
| 3,387,886 A * | 6/1968 | Longo et al. | 297/397 |
| 3,779,599 A * | 12/1973 | Gottfried | 297/253 |
| 3,784,253 A * | 1/1974 | Kohler et al. | 297/410 |
| 4,420,186 A * | 12/1983 | Vogt | 297/284.1 |
| 5,015,036 A * | 5/1991 | Fergie | 297/397 |
| 5,282,668 A * | 2/1994 | Heussner et al. | 297/238 |
| 5,312,160 A * | 5/1994 | Davis et al. | 297/397 |
| 5,501,508 A * | 3/1996 | Llewellyn | 297/397 |
| 6,817,673 B2 * | 11/2004 | Walker | B60N 2/002 297/440.2 |
| 6,843,530 B1 * | 1/2005 | Wu | A47C 7/38 297/284.3 |
| 6,945,601 B1 * | 9/2005 | Wu | A47C 7/38 297/284.1 |
| 7,044,555 B2 * | 5/2006 | Saberan | 297/408 |
| 7,156,462 B2 * | 1/2007 | Verny et al. | 297/354.13 |
| 7,547,071 B2 * | 6/2009 | Huffman | 297/397 |
| 7,654,602 B2 * | 2/2010 | Smiley et al. | 296/65.16 |
| 7,832,803 B2 * | 11/2010 | Cassaday | A47C 7/38 297/391 |
| 7,887,135 B2 * | 2/2011 | Oda | A47C 7/38 297/396 |
| 8,038,212 B2 * | 10/2011 | Vickers | B60N 2/2821 297/250.1 |
| 8,172,328 B2 * | 5/2012 | Ferro Montiu | 297/397 |
| 8,528,978 B2 * | 9/2013 | Purpura et al. | 297/394 |
| 2002/0043860 A1 * | 4/2002 | Dinkel | B60N 2/4808 297/410 |
| 2005/0168038 A1 * | 8/2005 | Kubo | 297/410 |
| 2006/0255635 A1 * | 11/2006 | Iijima et al. | 297/284.3 |
| 2007/0096497 A1 * | 5/2007 | Adragna et al. | 296/65.16 |
| 2008/0211283 A1 * | 9/2008 | Okano et al. | 297/341 |
| 2008/0290714 A1 * | 11/2008 | Barrou | 297/408 |
| 2008/0315657 A1 * | 12/2008 | Beroth et al. | 297/391 |
| 2011/0095590 A1 * | 4/2011 | Pozzi | A47C 7/38 297/404 |

OTHER PUBLICATIONS

Extended European Search Report (no English translation available) for European Patent Application No. 12159389.1 dated Sep. 24, 2013, 3 pages.

Official Action (English translation) for Chinese Patent Application No. 201210097137.4 mailed Mar. 5, 2014, 6 pages.

\* cited by examiner

PADDING OVERLAP

CROSS REFERENCE TO RELATED APPLICATIONS

This application claims the benefit of German Application No. 102011015348.9, filed Mar. 28, 2011, the disclosure of which is incorporated herein by reference.

The invention relates to a vehicle seat with a framework for fastening the vehicle seat to a vehicle body, with a seat part, with a backrest and with a head support comprising a head support suspension, in which the seat part and the backrest are arranged on the framework.

Vehicle seats of the generic type are well known from the prior art. As well as an adjustable backrest, the majority of vehicle seats also have adjustable seat parts and head supports, so that all in all the vehicle seats can be individually adapted to various passengers in a very satisfactory manner. On account of the multiplicity of setting parameters, however, the adaptation is frequently complicated, particularly if settings of this type have to be carried out by hand.

The object of the invention is thus further to develop a vehicle seat of the generic type to the effect that despite a lower setting effort it can be adapted equally well to the individual requirements of a passenger.

The object of the invention is attained by a vehicle seat with a framework for fastening the vehicle seat to a vehicle body, with a seat part, with a backrest and with a head support comprising a head support suspension, in which the seat part and the backrest are arranged on the framework and in which the head support suspension is formed by the framework or is fastened to the framework, in which case the head support suspension has a suspension part on the side towards the framework and a suspension part on the side towards the backrest, and the suspension part on the side towards the backrest is arranged outside the backrest.

As a result of the fact that the head support suspension on the one hand is formed by the framework of the vehicle seat or is fastened to the aforesaid framework, and on the other hand has a suspension part on the side towards the framework and a suspension part on the side towards the backrest, in which case the suspension part on the side towards the backrest is arranged outside the backrest, the head support is advantageously held or fastened respectively in a manner independent of the backrest but nevertheless directly on the vehicle seat.

In the sense of the invention the term "framework" describes a structure of the vehicle seat by way of which essentially all the forces occurring at the vehicle seat can be introduced into the vehicle body.

Ideally the structure of the framework is rigid, so that as a whole it is highly resistant to torsion.

To this end the framework is firmly bolted for example to the floor of a passenger compartment.

The framework is preferably used as the basis for receiving the remaining components of the vehicle seat, such as in particular the seat part, the backrest and the head support. Accordingly, the framework is a sort of rigid carrying framework for vehicle seat components.

Because of the framework, the vehicle seat has an extremely torsion-resistant design.

The vehicle seat is essentially a motor vehicle seat and, in this case in particular, a utility vehicle seat.

In accordance with a first advantageous design option the head support suspension is formed by the framework itself. In this case the head support suspension can be produced in a structurally simple manner by means of an extension of the framework to above the backrest. In an advantageous manner, a further component of the vehicle seat designed in the form of a head support suspension is not necessary, as a result of which the production and assembly outlay of the vehicle seat can be advantageously reduced. With this option a padding of the head support can be attached directly to the framework.

In accordance with a further no less advantageous design option the head support suspension is provided in the form of a separate component of the vehicle seat and is fastened to the framework in a suitable manner. In this case, in an advantageous manner, the head support can be removed from the framework without difficulty and can optionally be replaced with another one.

In both of the options named above the backrest can thus be altered without a change in the position of the head support. This is advantageous for example if the backrest is to be adjusted in its angle of inclination.

An adaptation of the angle of inclination of the backrest can be desirable for example if the seat part of the vehicle seat is pushed forwards or backwards.

If the seat part is pushed forwards for example, the lower end of the backrest is pushed horizontally forwards, so that the critical formation of a gap between the seat part and the backrest can be prevented. The upper end of the backrest accordingly moves vertically downwards.

In this respect, in accordance with an advantageous variant of embodiment it is provided that the backrest is arranged in a manner capable of being inclined with respect to the framework, in particular with respect to the head support suspension.

A particularly advantageous variant of embodiment provides that the suspension part on the side towards the backrest terminates in an overlap area in which the head support is capable of being arranged in front of or behind the backrest in an overlapping manner at least in part with respect to an upper end of the backrest.

In the sense of the invention the "overlap area" is described or characterized by a region of the backrest which can be covered by the head support.

In this case it is immaterial whether the head support is pushed in front of or behind the backrest in this case.

Ideally the overlap area is selected in such a way that no gap or only a negligibly small gap is formed between the backrest and the head support when the angle of inclination of the backrest is altered.

If the suspension part on the side towards the backrest is arranged loosely suspended with respect to the backrest, the backrest can be displaced, in particular with respect to the framework of the vehicle seat, without altering the position of the head support during this.

It is particularly advantageous for the suspension part on the side towards the backrest to be arranged abutting loosely—and preferably pre-stressed in a springing manner—against the backrest.

If the suspension part on the side towards the backrest abuts loosely against the backrest, the latter can readily be moved past the head support.

If the suspension part on the side towards the backrest abuts—pre-stressed in a cumulatively still springing manner—against the backrest, the head support and the backrest can always be closely in contact with each other.

In order to be able to reduce the friction between the backrest and the head support in an advantageous manner, it is expedient if the suspension part on the side towards the backrest has a sliding device for a padding of the backrest.

A structurally simple positioning of the head support on the backrest can be achieved in the present case if the suspension part on the side towards the framework and the suspension part on the side towards the backrest are arranged opposite each other and, in particular, comprise a common curved connecting part.

If the suspension part on the side towards the framework and the suspension part on the side towards the backrest are arranged opposite each other, the head support suspension can be produced with a low structural height.

If the suspension part on the side towards the framework and the suspension part on the side towards the backrest are connected to each other by means of a connecting part formed in a curve, the head support suspension as a whole can be produced in a simple manner in the form of a component formed in a U shape.

It is preferable for the U shape of the head support suspension to be made open at the bottom, so that the suspension part on the side towards the backrest can overlap in an uncomplicated manner with the backrest at a radial distance from the suspension part on the side towards the framework.

The upper end of the backrest can be arranged in an advantageous manner in an intermediate space formed by the U shape if the suspension part on the side towards the backrest overlaps with the backrest.

In this respect a particularly preferred variant of embodiment provides that the head support suspension and/or the head support form an envelope, in the volume of which the backrest is capable of being arranged at least in part.

If the head support suspension has a curved main body which, in particular, comprises a tube bend to the left and right of a head support padding in each case, the head support can structurally be produced in a particularly simple manner.

In order to be able to position the head padding of the head support far enough into the seating area of the vehicle seat and thus close to the head of a passenger occupying the vehicle seat, it is particularly advantageous for the suspension part on the side towards the backrest to be made bulging.

In this case the bulge of the suspension part on the side towards the backrest advantageously projects into the seating area of the vehicle seat.

At this point it should be further mentioned for the sake of completeness that it is advantageous for the backrest to be arranged freely movable with respect to the head support. As a result, a displacement of the backrest in particular can be carried out without the position of the head support being altered.

If an additional vertical setting is also specifically necessary with respect to the head support, it is advantageous for the head support suspension to comprise a vertical adjustment device.

This vertical adjustment device can be designed in a manner known per se.

In this case it is possible for example for the entire head support suspension to be adjusted vertically.

It is also possible, however, for only one head padding frame to be vertically adjusted with respect to the head support suspension by means of a suitable mechanism.

Further advantages, aims and properties of the present invention are explained with reference to the accompanying drawing and the following description, in which vehicle seats with a head support suspension according to the invention are illustrated and described by way of example.

Figure 1:
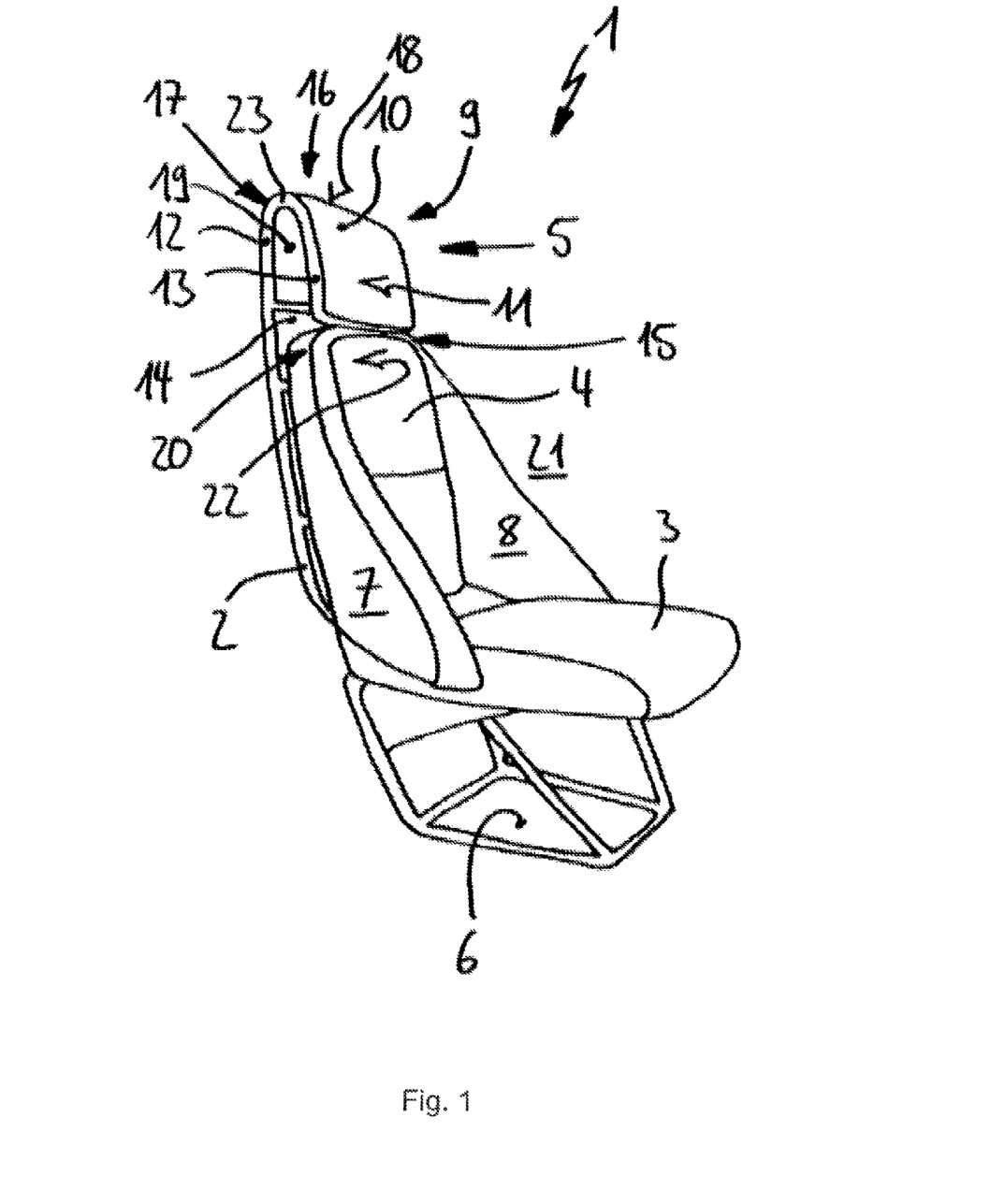
FIG. 1 is a diagrammatic perspective view of a vehicle seat with an overlap area between a head support and a backrest, in which case a suspension part of the head support on the side towards the backrest is arranged in front of the backrest.

The vehicle seat 1 shown in FIG. 1 essentially has a rigid framework 2, a seat part 3, a backrest 4 and a head support 5.

The vehicle seat 1 is fastened with the framework 2 to a floor 6 of a passenger compartment (not shown in detail here) of a motor vehicle, in particular a utility motor vehicle.

Side pieces 7 and 8 to improve the lateral guidance of a passenger are present at the side of the backrest 4 and also of the seat part 3.

The backrest 4 can be inclined with respect to the framework by means of a mechanism (not shown here). In particular when the seat part 3 is pulled forward.

The framework 2 extends up from the floor 6 as far as the head support 5.

The head support 5 essentially comprises a head support suspension 9 and a head support padding device 10.

The head support padding device 10 in turn comprises a head support padding frame (not shown here) and a head support padding 11 which is carried or stretched from the head support padding frame.

The head support suspension 9 is divided into a suspension part 12 on the side towards the framework and a suspension part 13 on the side towards the backrest, which merge into each other in a flowing manner by means of a common curved connecting part 23. In this case the suspension part 12 on the side towards the framework and the suspension part 13 on the side towards the backrest are situated directly opposite.

In this respect the head support suspension 9 is made U-shaped in the form of a component opened at the bottom, so that an intermediate space 14 for receiving an upper end 15 of the backrest 4 is formed between the suspension part 12 on the side towards the framework and the suspension part 13 on the side towards the backrest.

The U-shaped component opened at the bottom thus forms a curved base body 16 of the head support suspension 9 which in this embodiment comprises a tube bend 17 (numbered only by way of example in this case) to the left and right of the head support padding 11 respectively.

Together the head support 5 and, in particular, also the head support suspension 9 form an envelope 18 with a volume 19 in which at least the upper end 15 of the backrest is capable of being arranged at least in part.

In this way, an overlapping region 20, in which the head support 5 is capable of being arranged in front of the backrest 4 in an overlapping manner at least in part with respect to the upper end 15 of the backrest, is formed on the vehicle seat 1.

In this embodiment the head support suspension 9 is designed in the form of an extension directly from the framework 2, so that the head support suspension 9 is formed on the vehicle seat 1 in a structurally simple manner.

In this case the framework 2 terminates with the suspension part 13 on the side towards the backrest in the region of the upper end 15 of the backrest outside the backrest 4.

In an advantageous manner the suspension part 13 on the side towards the backrest is arranged loosely suspended with respect to the backrest 4.

In this respect the backrest 4 can move freely with respect to the head support 5, without the position of the head support 5 being changed if for example an angle of inclination of the backrest 4 is altered.

In order that the head support 5 or the head support padding 11 respectively may project sufficiently far into a seating area 21 of the vehicle seat 1 in order for example to be able to support a head in an ergonomically satisfactory manner, the suspension part 13 on the side towards the backrest is made bulging.

In addition, the suspension part 13 on the side towards the backrest abuts—in a manner pre-stressed by the U shape of the head support suspension 9—against a padding 22 of the backrest 4, as a result of which a direct closeness of the head support 5 to the backrest 4 can be formed.

In order that the padding 22 of the backrest is, in particular, stressed mechanically as little as possible by the direct contact with the suspension part 13 on the side towards the backrest, the suspension part 13 on the side towards the backrest has a sliding device (not visible or numbered in this case) facing the padding 22 of the backrest.

Figure 2:
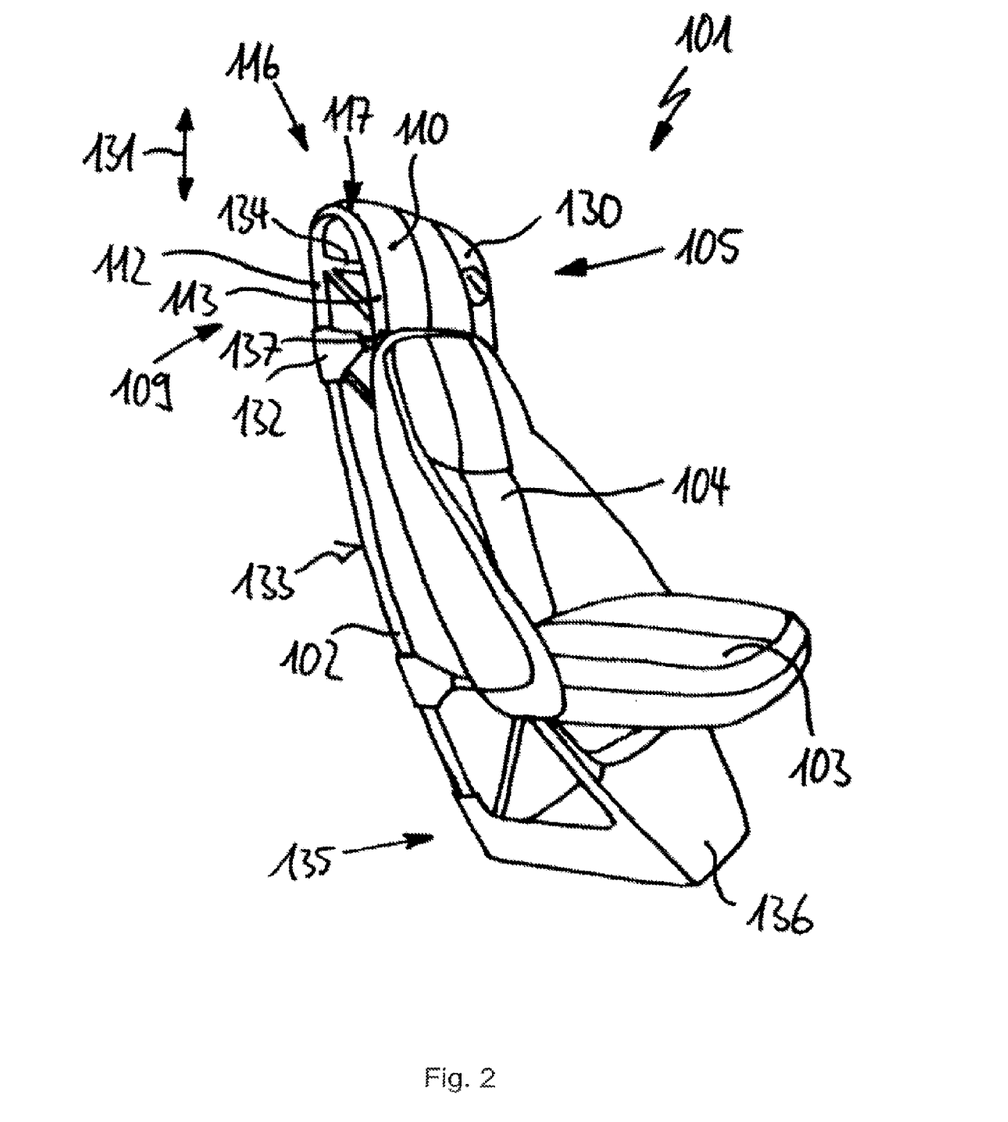
FIG. 2 is a diagrammatic perspective view of a further vehicle seat with an overlap area between a head support and a backrest, in which case a suspension part of the head support on the side towards the backrest is arranged behind the backrest.

The vehicle seat 101 shown in FIG. 2 is likewise essentially characterized by a rigid framework 102, a seat part 103, a backrest 104 and a head support 105. On account of the structural closeness to the vehicle seat 1 of FIG. 1, only the essential differences are described below in order also to avoid repetition in this way.

In this further embodiment the head support 105 also essentially comprises a head support suspension 109 and a head support padding device 110.

A setting device 130, by means of which a vertical adjustment 131 in particular of the head support padding device 110 can also be carried out if necessary for example, is arranged on the left next to the head support 105.

In contrast to the design as shown in FIG. 1 the head support suspension 109 is designed in the form of a stand-alone U-shaped component with a curved base body 116 comprising a suspension part 112 on the side towards the framework and a suspension part 113 on the side towards the backrest, in which case the suspension part 113 on the side towards the backrest extends in a loosely suspended manner to a point behind the backrest 104. In this respect the suspension part 113 on the side towards the backrest is arranged outside the backrest 104.

The suspension part 112 on the side towards the framework is connected to the remainder of the framework 102 of the vehicle seat 101 by way of a holding sleeve 132 and it can be additionally welded to a tube structure 133 of the framework 102.

In order to stabilize the stand-alone head support suspension 109, additional transverse braces 134 are provided between tube bends 117 arranged to the left and right of the head support padding device 110, so that the head support 105 as a whole has a highly robust design.

In the lower region 135 of the vehicle seat 103 the framework 102 is covered further by a covering 136.

In this respect the essential differences from the first embodiment as shown in FIG. 1 lie in the fact that the head support suspension 109 in itself constitutes a separate component by which the framework 102 is enlarged at the top, and in the fact that the suspension part 113 on the side towards the backrest is positioned at least with its end region 137 behind the backrest 104 when the head support 105 is properly mounted.

Figure 3:
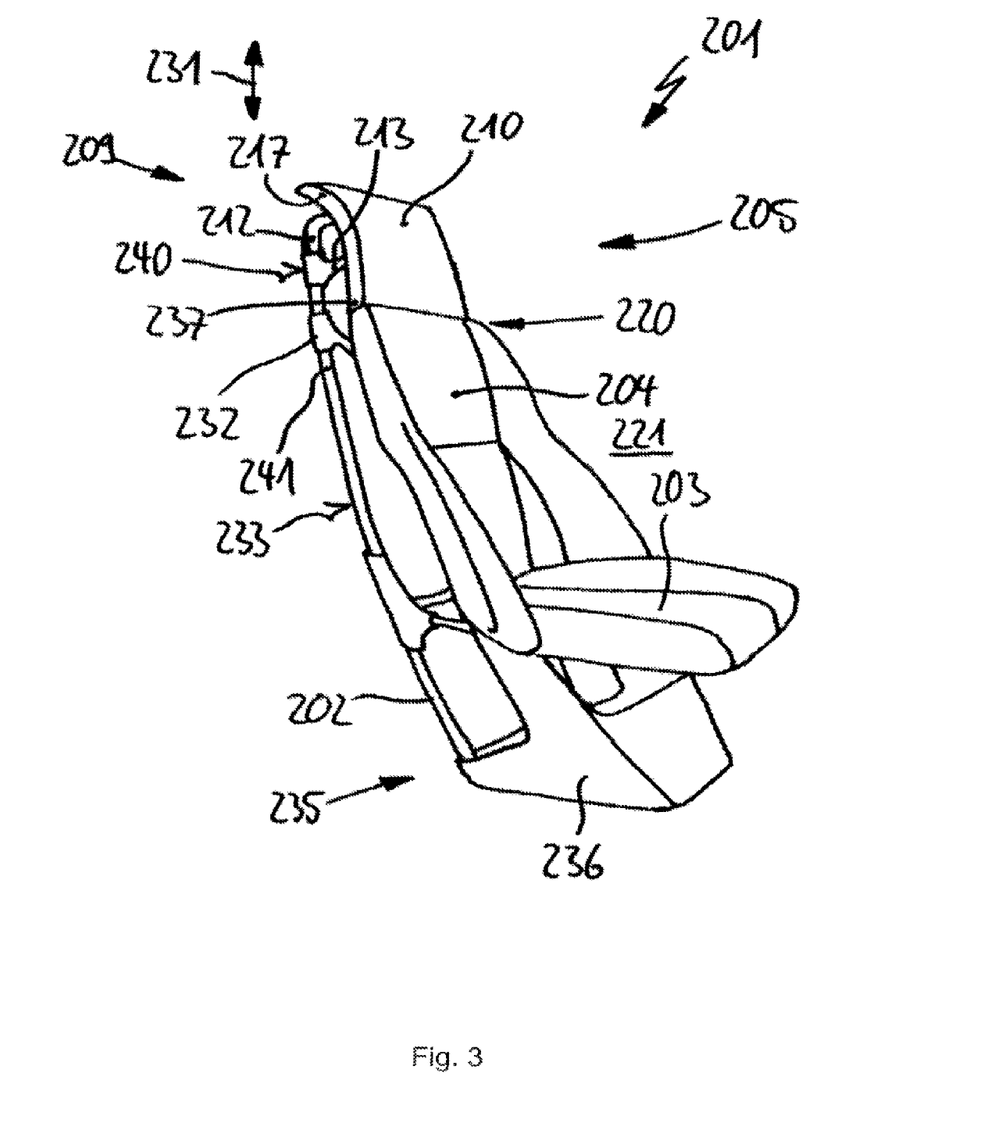
FIG. 3 is a diagrammatic perspective view of an alternative vehicle seat, in which a suspension part of the head support on the side towards the backrest is likewise arranged behind the backrest.

In the case of the alternative vehicle seat 201 shown in FIG. 3 a suspension part 213—on the side towards the backrest—of a suspension 209 of a head support 205 is positioned in particular with its end region 237 likewise behind and thus outside a backrest 204 of the vehicle seat 203. In this way, an overlap area 220, which however as in the embodiment according to FIG. 2 is situated not in front of but behind the backrest 204, is also formed here.

The suspension part 213 on the side towards the backrest comprises a tube bend 217 (shown only by way of example in this case) on the left and right of the head support 205 in each case, as a result of which a padding device 210 of the head support 205 curved into a seating area 221 can also be provided.

In this case the suspension part 213 on the side towards the backrest is fastened in a vertically adjustable manner to a part 212 of the head support suspension 209 on the side towards the framework by means of a sliding sleeve 240 capable of engaging on this very suspension part 212 on the side towards the framework, as a result of which in particular the head support padding device 210 can be vertically adjusted with respect to a part 203 of the vehicle seat 201.

In this way, the suspension part 212 on the side towards the framework does not merge in an integral manner into the suspension part 213 on the side towards the backrest, as is still the case in the embodiments described above.

In this case the suspension part 212 on the side towards the framework in fact extends transversely between two vertical tubes 241 (numbered only by way of example in this case) of the framework 202.

By way of example, an adequate engagement for a simple vertical adjustment 231 can be achieved by means of notches (not shown in detail in this case) on the suspension part 212 on the side towards the framework.

In this respect the head support suspension 209, in contrast to those described above by way of example, is now formed in a multiplicity of parts, in particular in two parts, with a separate suspension part 212 on the side towards the framework and a separate suspension part 213 on the side towards the backrest.

The suspension part 212 on the side towards the framework is arranged on a tube structure 233 of a framework 202 of the vehicle seat 201 by means of a holding sleeve 232, so that the head support 205 can be removed from the framework 202.

In the lower region 235 of the vehicle seat 201 a covering 236 for the framework 202 is also provided in this embodiment.

It is to be understood that the embodiments explained above are merely first designs of vehicle seats according to the invention. In this respect the design of the invention is not restricted to these embodiments.

Figure 4:
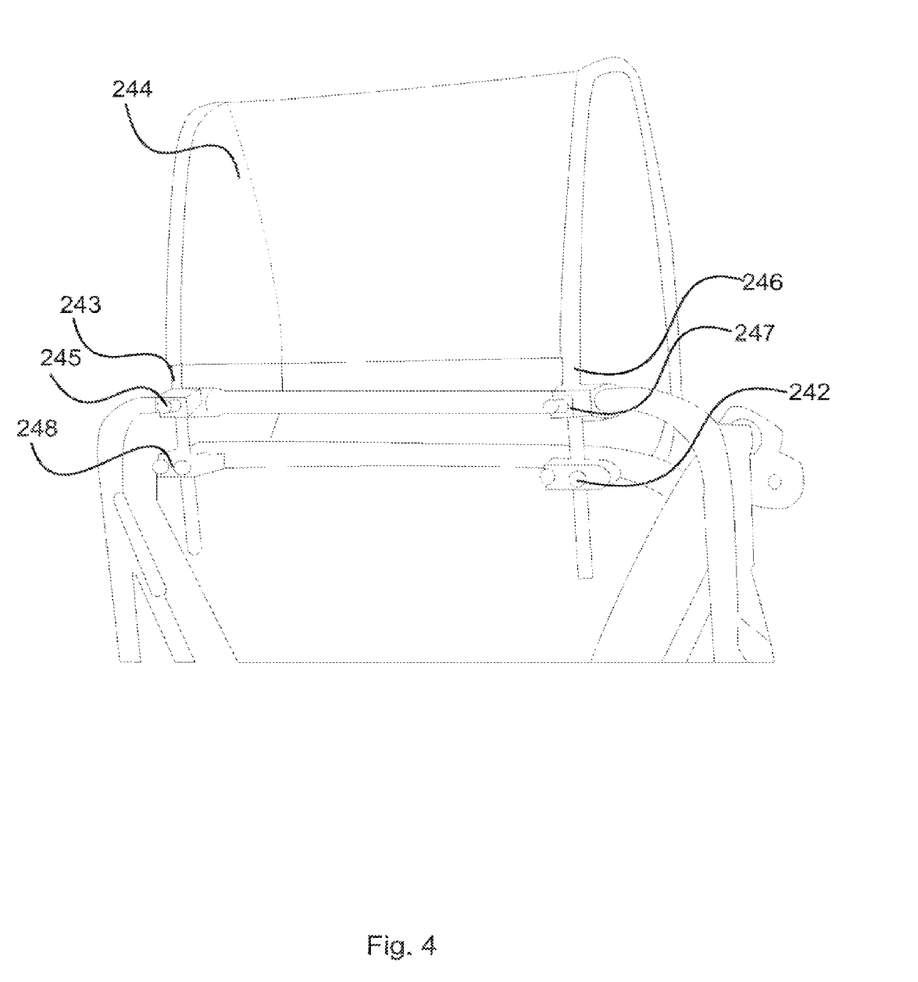
FIG. 4 is a diagrammatic cut-away view of an alternative vehicle seat from the rear side, in which the fastening of a head support is shown.

An alternative vehicle seat is shown in a cut-away view in FIG. 4. This vehicle seat which is illustrated obliquely from the rear has a head support 244 which comprises two curved tube elements 243 and 246, in which case a knitted fabric for forming a surface is pulled onto the tube elements. The tube elements 243 and 246 engage in two mountings 245 and 247 fastened to a backrest frame and, in addition, they can be arranged inside sliding elements 242 and 248 of plastics material. These sliding elements 242 and 248 of plastics material result in a resistance stressing of the two tube elements 243 and 246 when the two tube elements 243 and 246 are displaced upwards or downwards. As a result, an easy adjustment of the head support in the vertical direction relative to the backrest frame is possible.

All the features disclosed in the application documents are claimed as being essential to the invention, insofar as they are novel either individually or in combination as compared with the prior art.

LIST OF REFERENCES 1 vehicle seat
2 framework
3 seat part
4 backrest
5 head support
6 floor
7 right-hand side piece
8 left-hand side piece
9 head support suspension
10 head support padding device
11 head support padding
12 suspension part on the side towards the framework
13 suspension part on the side towards the backrest
14 intermediate space
15 upper end of the backrest
16 base body
17 right-hand tube bend
18 envelope
19 volume
20 overlap area
21 seating area
22 backrest padding
101 vehicle seat
102 framework
103 seat part
104 backrest
105 head support
109 head support suspension
110 head support padding device
112 suspension part on the side towards the framework
113 suspension part on the side towards the backrest
116 base body
117 right-hand tube bend
130 adjustment device
131 vertical adjustment
132 holding sleeve
133 tube structure
134 transverse braces
135 lower region
136 covering
137 end region
201 vehicle seat
202 framework
203 seat part
204 backrest
205 head support
209 head support suspension
210 head support padding device
212 suspension part on the side towards the framework
213 suspension part on the side towards the backrest
217 right-hand tube bend
220 overlap area
221 seating area
231 vertical adjustment
232 holding sleeve
233 tube structure
235 lower region
236 covering
237 end region
240 sliding sleeve
241 vertical tubes
242 sliding element of plastics material
243 tube elements
244 head support
245 mounting
246 tube elements
246 mounting
248 sliding element of plastics material

The invention claimed is:

1. A vehicle seat with a framework for fastening the vehicle seat to a vehicle body, with a seat part, with a backrest and with a head support comprising a head support suspension, wherein the head support suspension is formed by the framework, wherein the head support suspension has a suspension part on a rearward side a suspension part on a forward side towards the backrest, and wherein the suspension part on the forward side is arranged outside the backrest, wherein the angle of inclination of the backrest to the framework is adjustable, wherein the suspension part on the forward side is arranged abutting loosely, and pre-stressed in a springing manner, against the backrest, and wherein the head support suspension has a curved main body which comprises a tube bend.

2. The vehicle seat according to claim 1, wherein the suspension part on the forward side terminates in an overlap area in which the head support is capable of being arranged in front of the backrest in an overlapping manner at least in part with respect to an upper end of the backrest.

3. The vehicle seat according to claim 1, wherein the suspension part on the forward side is arranged loosely suspended with respect to the backrest.

4. The vehicle seat according to claim 1, wherein the suspension part on the rearward side and the suspension part on the forward side are arranged opposite each other and, in particular, comprise a common curved connecting part.

5. The vehicle seat according to claim 1, wherein the suspension part on the forward side made bulging.

6. The vehicle seat according to claim 1, wherein the backrest is arranged in a manner capable of being inclined with respect to the head support suspension.

7. The vehicle seat according to claim 1, wherein the framework is a rigid carrying framework for vehicle seat components.

8. A vehicle seat with a framework for fastening the vehicle seat to a vehicle body, with a seat part, with a backrest and with a head support comprising a head support suspension, wherein the head support suspension is formed by the framework, wherein the head support suspension has a suspension part on a rearward side and a suspension part on a forward side towards the backrest, and wherein the suspension part on the forward side terminates in an overlap area at an upper end of the backrest, wherein the angle of inclination of the backrest to the framework is adjustable, wherein the suspension part on the forward side is arranged abutting loosely, and pre-stressed in a springing manner, against the backrest, and wherein the head support suspension has a curved main body which comprises a tube bend.

9. The vehicle seat according to claim 8, wherein the suspension part on the forward side is arranged in front of the upper end of the backrest at the overlap area.

10. The vehicle seat according to claim 8, wherein the suspension part on the forward side is arranged in back of the upper end of the backrest at the overlap area.

11. The vehicle seat according to claim 8, wherein the suspension part on the rearward side and the suspension part on the forward side are integral with each other.

12. The vehicle seat according to claim 8, wherein the suspension part on the rearward side and the suspension part on the forward side are not integral with each other.

13. The vehicle seat according to claim 8, wherein the head support is integral with the framework.

14. The vehicle seat according to claim 8, wherein the framework is a rigid carrying framework for vehicle seat components.

\* \* \* \* \*